(12) United States Patent
Coon et al.

(10) Patent No.: US 11,032,971 B2
(45) Date of Patent: Jun. 15, 2021

(54) COMPOSITE STALK ROLL

(71) Applicant: Deere & Company, Moline, IL (US)

(72) Inventors: Steve A. Coon, Long Grove, IA (US); Nathan E. Krehbiel, Bettendorf, IA (US); Troy M. Heims, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 99 days.

(21) Appl. No.: 16/381,182

(22) Filed: Apr. 11, 2019

(65) Prior Publication Data

US 2020/0323139 A1     Oct. 15, 2020

(51) Int. Cl.
*A01D 45/02*        (2006.01)

(52) U.S. Cl.
CPC .................. *A01D 45/025* (2013.01)

(58) Field of Classification Search
CPC ....... A01D 45/025; A01D 82/02; A01D 45/02
See application file for complete search history.

(56) References Cited

U.S. PATENT DOCUMENTS

| | | | | | |
|---|---|---|---|---|---|
| 2,416,123 A | * | 2/1947 | Siemen | ............................ | 460/34 |
| 2,572,276 A | * | 10/1951 | Edgar | ..................... | A01D 34/62 152/7 |
| 3,325,878 A | * | 6/1967 | Johnston | ................. | A01D 82/02 241/294 |
| 4,083,279 A | * | 4/1978 | Wester | ................... | B26D 7/2614 83/347 |
| 4,807,820 A | * | 2/1989 | Gundlach | ............... | B02C 4/305 241/294 |
| 5,404,699 A | * | 4/1995 | Christensen | ......... | A01D 45/025 460/31 |
| 6,050,071 A | * | 4/2000 | Bich | ..................... | A01D 45/025 56/104 |
| 8,037,667 B2 | * | 10/2011 | Eagles | .................. | A01D 45/025 56/103 |
| 2014/0182255 A1 | | 7/2014 | Calmer | | |
| 2017/0311542 A1 | * | 11/2017 | Ehle | ....................... | A01D 34/44 |

FOREIGN PATENT DOCUMENTS

EP          1040746 A1     10/2000

* cited by examiner

*Primary Examiner* — Thomas B Will
*Assistant Examiner* — Madeline Ivy Runco
(74) *Attorney, Agent, or Firm* — Michael Best & Friedrich LLP

(57) ABSTRACT

A stalk roll for a corn harvester has a first portion including a first material having a first material density, and a second portion including a second material having a second material density. The first density is at least fifty percent greater than the second density, or the first tensile strength is at least fifty percent greater than the second tensile strength. The first portion includes a support portion that engages a drive shaft, a first radial portion extending radially outward from the support portion, a first blade connected to the first radial portion, a second radial portion extending radially outward from the support portion opposite the first radial portion, and a second blade connected to the second radial portion. The first and second blade portions engage a corn stalk. The second portion is positioned between the first radial portion and the second radial portion.

20 Claims, 8 Drawing Sheets

COMPOSITE STALK ROLL

BACKGROUND

The present disclosure relates to a stalk roll configuration for a harvester.

SUMMARY

In some embodiments, the disclosure provides a stalk roll for a corn harvester having a drive shaft configured to rotate the stalk roll. The stalk roll includes a first portion made of a first material having a first density. The first portion includes a support portion that engages the drive shaft, a first radial portion having a first end connected to the support portion and a second end positioned radially outward from the support portion. A first blade is connected to the second end of the first radial portion, and is positioned to engage a corn stalk. A second radial portion has a first end connected to the support portion opposite the first radial portion and a second end positioned radially outward from the support portion. A second blade is connected to the second end of the second radial portion, and is positioned to engage a corn stalk. A second portion includes a second material having a second density. The second portion is positioned adjacent the first blade and adjacent the second blade. The first density is at least fifty percent greater than the second density.

In some embodiments, the disclosure provides a corn harvester including a work vehicle that moves along a ground surface, a crop divider that separates adjacent rows of corn stalks, a drive shaft that rotates in response to operation of the work vehicle, a first stalk roll portion and a second stalk roll portion. The first stalk roll portion includes a first material having a first tensile strength. The first stalk roll portion includes a first support portion that engages the drive shaft, a first radial portion having a first end connected to the support portion and a second end positioned radially outward from the support portion, a first blade connected to the second end of the first radial portion and positioned to engage a corn stalk, a second radial portion having a first end coupled to the support portion opposite the first radial portion and a second end positioned radially outward from the support portion, and a second blade connected to the second end of the second radial portion and positioned to engage a corn stalk. The second stalk roll portion includes a second material having a second tensile strength, and is positioned adjacent the first blade and adjacent the second blade. The first tensile strength is at least fifty percent greater than the second tensile strength.

In some embodiments, the disclosure provides a stalk roll for a corn harvester having a drive shaft configured to rotate the stalk roll. The stalk roll includes a first portion including a first material having a first tensile strength. The first portion includes a first central support portion configured to engage the drive shaft, a first flange extending from the first central support portion to a first location radially spaced from the first central support portion, and a second flange extending from the first central support portion to a second location radially spaced from the first central support portion. A first elongate blade is connected to the first flange at the first location and is connected to the second flange at the second location. The first elongate blade is configured to engage a corn stalk. A third flange extends from the first central support portion to a third location radially spaced from the first central support portion and opposite the first flange. A fourth flange extends from the first central support portion to a fourth location radially spaced from the first central support portion and opposite the second flange. A second elongate blade is connected to the third flange at the third location and to the fourth flange and the fourth location. The second elongate blade is configured to engage a corn stalk. A second central support portion is spaced from the first central support portion and is configured to engage a gear case mounting point. A fifth flange extends between the first elongate blade and the second central support portion. A first auger blade is connected to the fifth flange and extends toward the second central support portion. A sixth flange extends between the second elongate blade and the second central support portion. A second auger blade is connected to the sixth flange and extends toward the second central support portion. A second portion of the stalk roll includes a second material having a second tensile strength. The second portion is positioned adjacent the first elongate blade and adjacent the second elongate blade. The first tensile strength is at least fifty percent greater than the second tensile strength. The first material is metallic and the second material is non-metallic. The first material has a first density and the second material has a second density. The first density is at least fifty percent greater than the second density.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
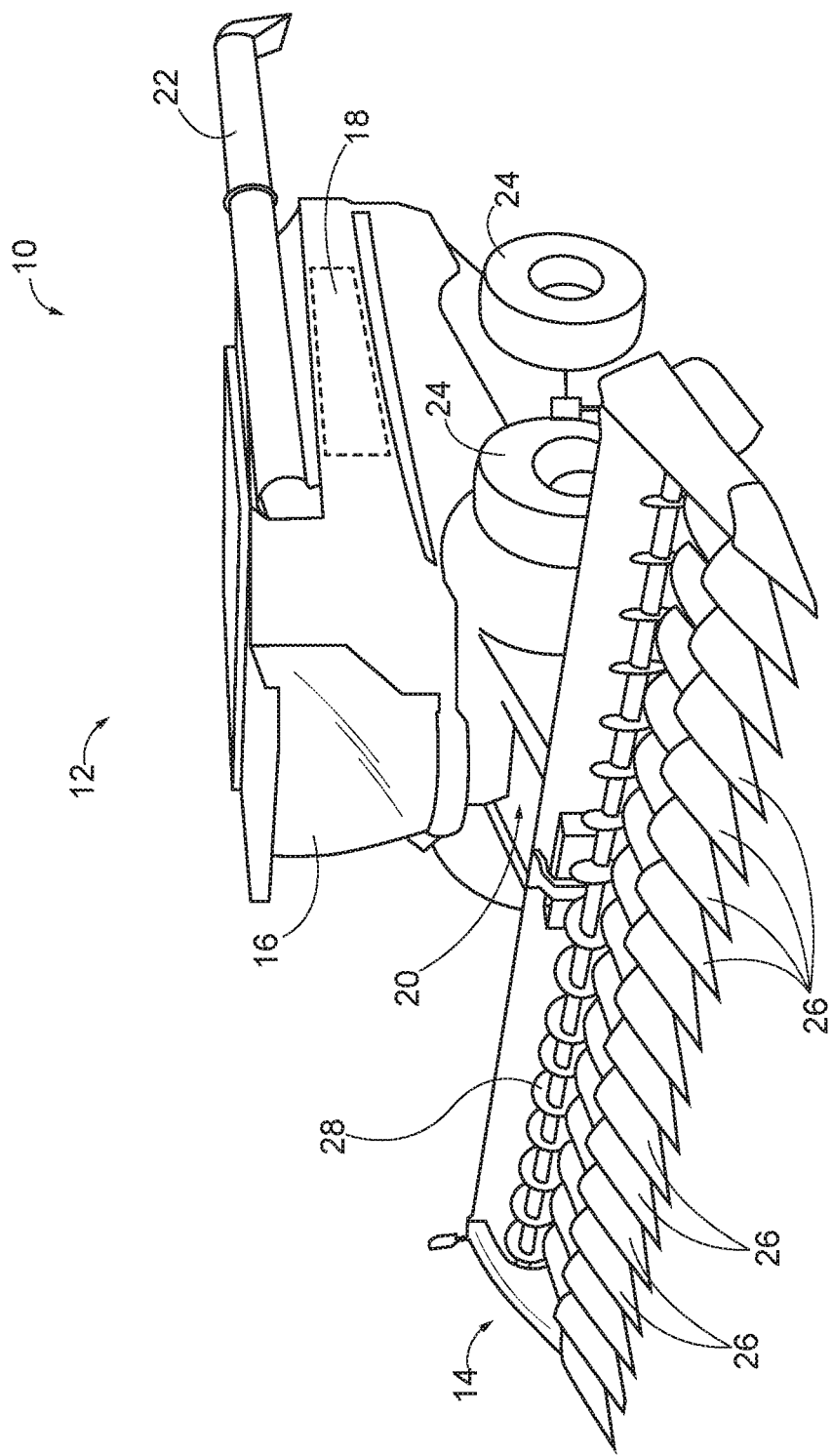
FIG. 1 is a perspective view of a corn harvester.

FIG. 1 illustrates a corn harvester 10 including a work vehicle 12 and a corn harvesting attachment 14. The illustrated work vehicle 12 includes an operator cab 16, an engine 18, a hopper 20, a dispensing chute 22, and a plurality of wheels 24. Other work vehicles can include tracks in place of the plurality of wheels. The illustrated corn harvesting attachment 14 includes a plurality of crop dividers 26 and a cross auger 28.

Figure 2:
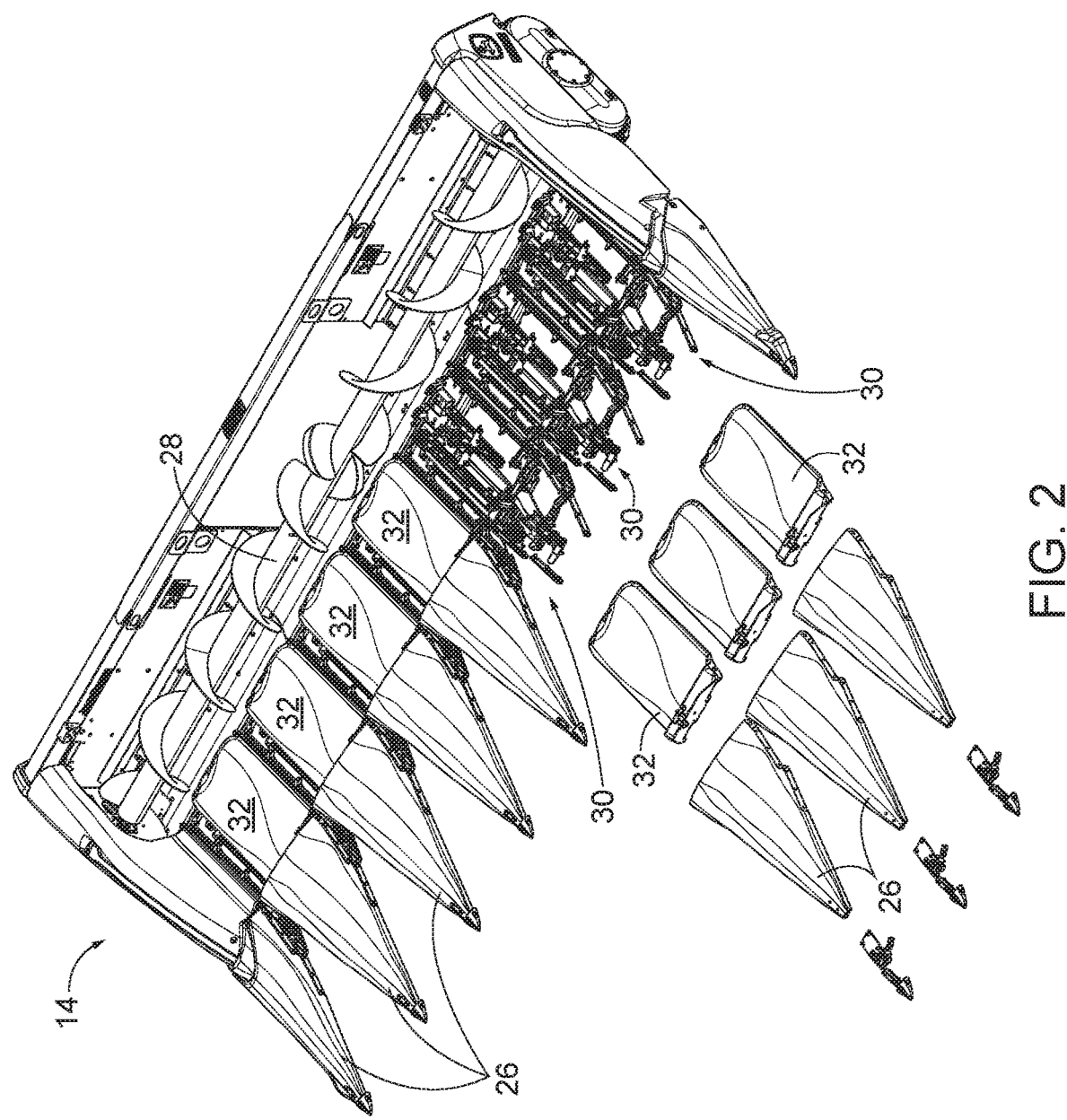
FIG. 2 is a partially exploded view of the corn stalk roll assemblies of FIG. 1.

FIG. 2 illustrates that each of the crop dividers 26 direct corn stalks toward stalk roll assemblies 30. The crop dividers 26 also include covers 32 positioned behind each crop divider 26 and between two stalk roll assemblies 30. Some crop dividers 26 and stalk roll covers 32 are removed from some stalk roll assemblies 30 in FIG. 2.

Figure 3:
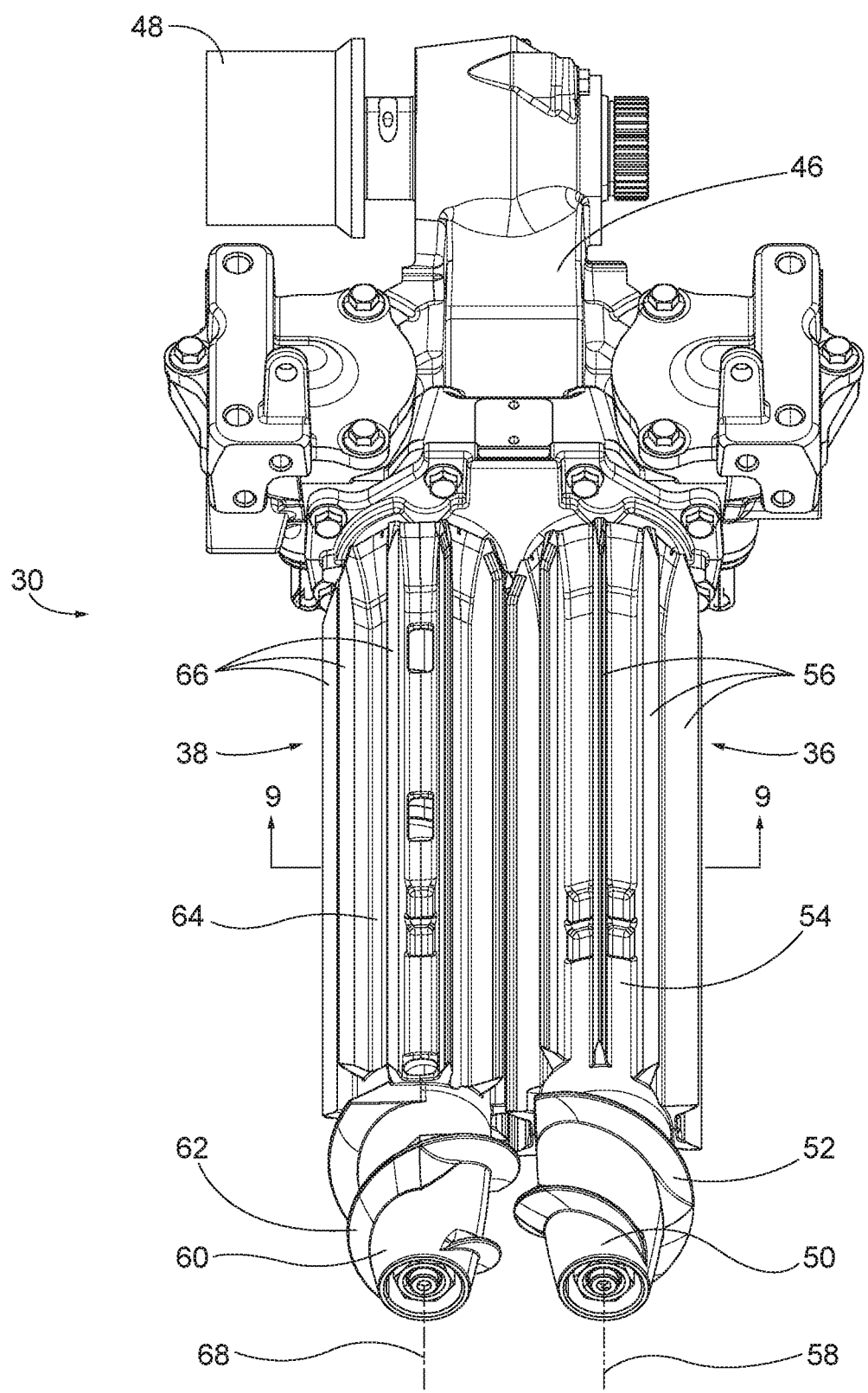
FIG. 3 is a perspective view of one corn stalk roll assembly with some parts removed for clarity.

FIG. 3 illustrates one stalk roll assembly 30 with parts removed for clarity. The illustrated stalk roll assembly 30 includes a first stalk roll 36, a second stalk roll 38, a gear casing 46 and a motor 48. The illustrated first stalk roll 36 includes a frustoconical tip 50 having a helical blade 52, and a cylindrical portion 54 having a plurality of blades 56 that extend along a circumference of the cylindrical portion 54 of the first stalk roll 36 in the axial direction. The first stalk roll 36 is configured to rotate about a first longitudinal axis 58 in response to the motor 48. The illustrated first stalk roll 36 is rotated counter clockwise when viewed from the end with the frustoconical tip 50. The illustrated blades 56 are evenly circumferentially spaced around a circumference of the cylindrical portion 54. The illustrated first stalk roll 36 includes ten blades 56. However, in other embodiments, other quantities and configurations of blades 56 can be utilized.

The illustrated second stalk roll 38 includes a frustoconical tip 60 having a helical blade 62 and a cylindrical portion 64 having a plurality of blades 66 that extend along a circumference of the cylindrical portion 64 of the second stalk roll 38 in the axial direction. The second stalk roll 38 is configured to rotate about a second longitudinal axis 68 in response to the motor 48. The illustrated second stalk roll 38 is rotated clockwise when viewed from the end with the frustoconical tip 60. The illustrated blades 66 are evenly circumferentially spaced around a circumference of the cylindrical portion 64. The illustrated second stalk roll 38 includes ten blades 66. However, in other embodiments, other quantities and configurations of blades 66 can be utilized.

The first and second stalk rolls 36, 38 are configured to engage corn stalks during corn harvesting. The first longitudinal axis 58 is parallel to the second longitudinal axis 68. The illustrated second stalk roll 38 is a mirror image of the first stalk roll 36. The discussion of the second stalk roll 38 applies equally to the first stalk roll 36.

Figure 4:
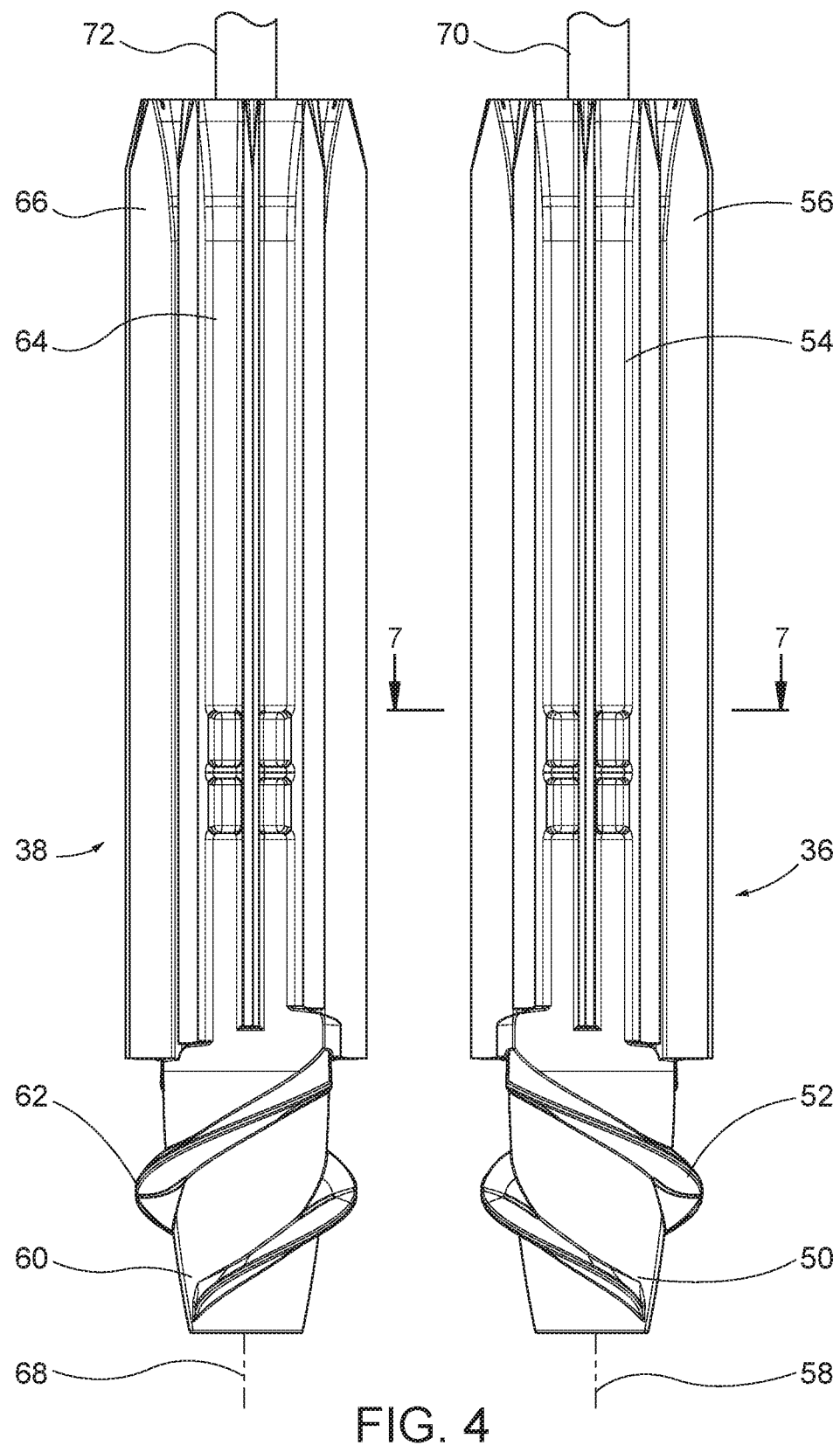
FIG. 4 is a perspective view of the stalk rolls of FIGS. 1-3 spaced apart for clarity.

FIG. 4 illustrates the first and second stalk rolls 36, 38 in greater detail. The first stalk roll 36 is spaced apart from the second stalk roll 38 for clarity. The first stalk roll 36 is coupled to a first drive shaft 70 for rotation about the first longitudinal axis 58. The first drive shaft 70 is rotated by the motor 48 via the gears in the gear casing 46. The first drive shaft 70 includes one or more protrusions that are sized to engage mating recesses in the first stalk roll 36.

The second stalk roll 38 is coupled to a second drive shaft 72 for rotation about the second longitudinal axis 68. The second drive shaft 72 is rotated by the motor 48 via the gears in the gear casing 46. The second drive shaft 72 includes one or more protrusions that are sized to engage mating recesses in the second stalk roll 38.

Figure 5:
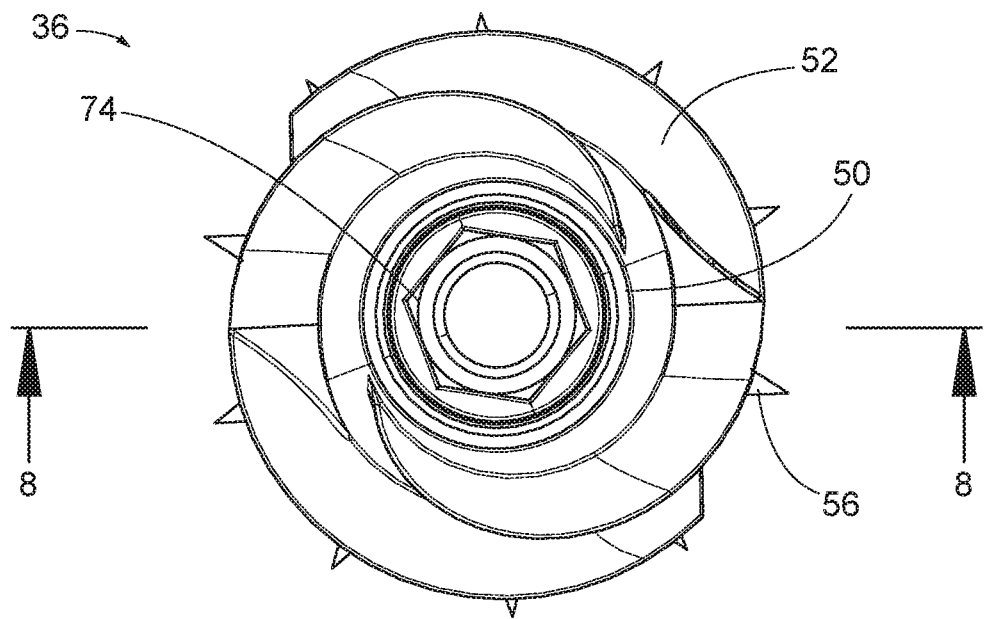
FIG. 5 is a front end view of one of the stalk rolls of FIG. 4.

FIG. 5 is a front end view of the first stalk roll 36 showing the frustoconical tip 50 and the helical blade 52 in greater detail. FIG. 5 also illustrates the tips of all ten blades 56. FIG. 5 also illustrates a nut 74 configured to engage the second drive shaft 72. The illustrated nut 74 has a hexagonal outer profile and a threaded inner profile.

Figure 6:
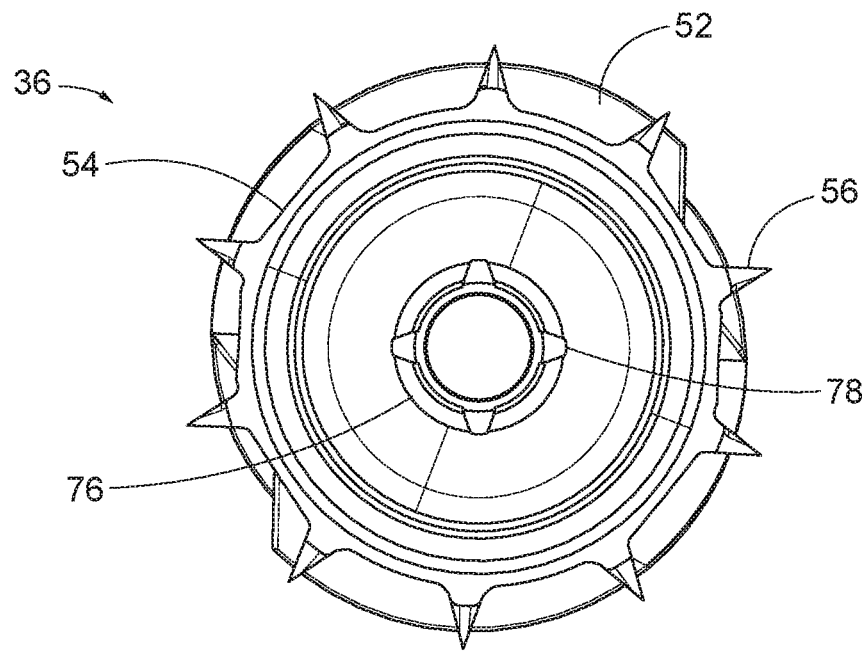
FIG. 6 is a rear end view of the stalk roll of FIG. 5.

FIG. 6 is a rear end view of the first stalk roll 36 showing the helical blade 52, the cylindrical portion 54 and all ten of the blades 56. FIG. 6 also illustrates a support ring 76 that is configured to engage the first drive shaft 70. The illustrated support ring 76 includes four keyways 78 that are sized to receive corresponding keys on a perimeter of the first drive shaft 70. The keys on the perimeter of the first drive shaft 70 can be integrally formed with the first drive shaft 70 or can be mechanically coupled to the first drive shaft 70 (e.g., by a keyseat). While four keyways are shown, other quantities and configurations of keyways can be utilized.

Figure 7:
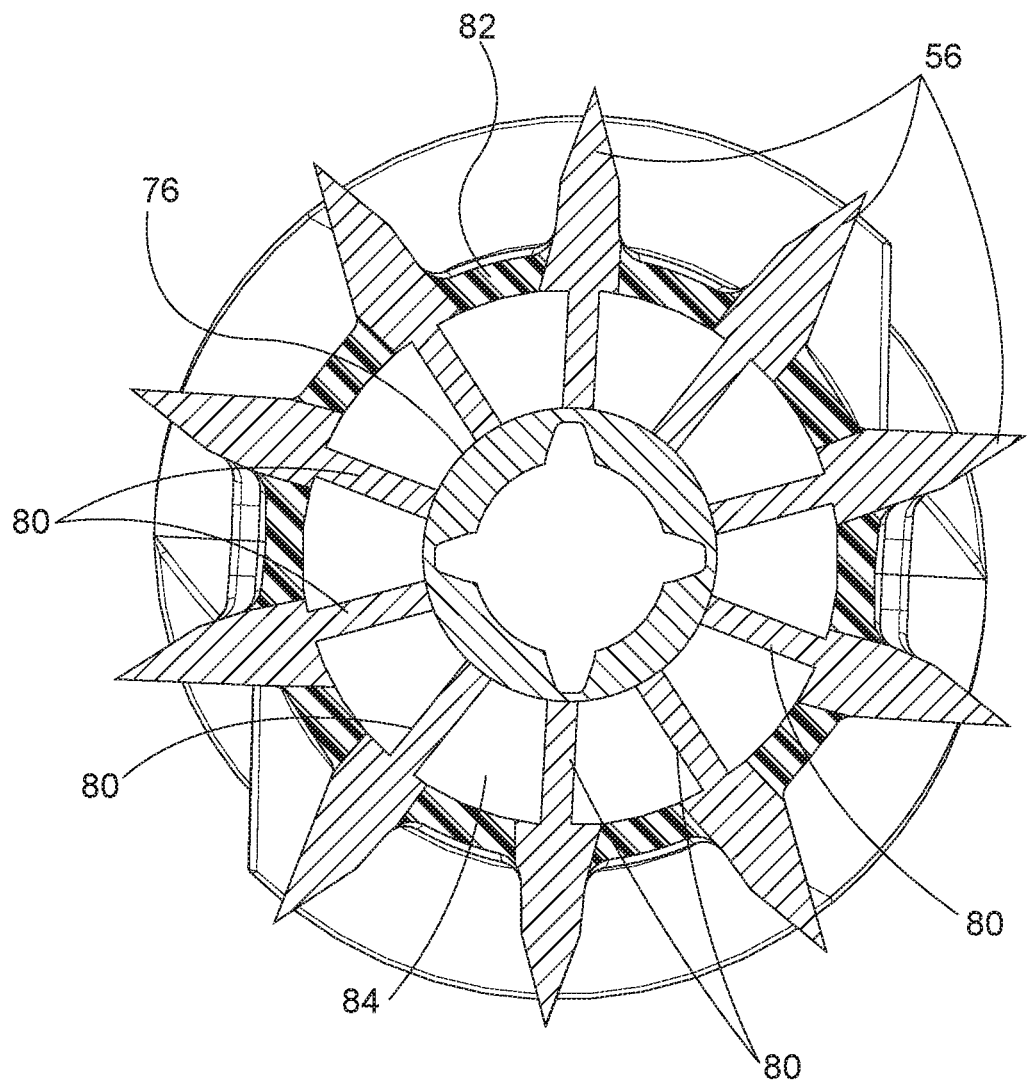
FIG. 7 is a cross-sectional view taken along line 7-7 of FIG. 4.

FIG. 7 is a cross-sectional view taken along line 7-7 of FIG. 4. FIG. 7 illustrates a first stalk roll portion that includes the support ring 76, a plurality of radial portions 80 extending radially outward from the support ring 76, and the blades 56, and a second stalk roll portion 82 that is positioned between adjacent blades 56. A space 84 is defined between pair of adjacent radial portions 80 and between the support ring 76 and the second stalk roll portion 82.

Figure 8:
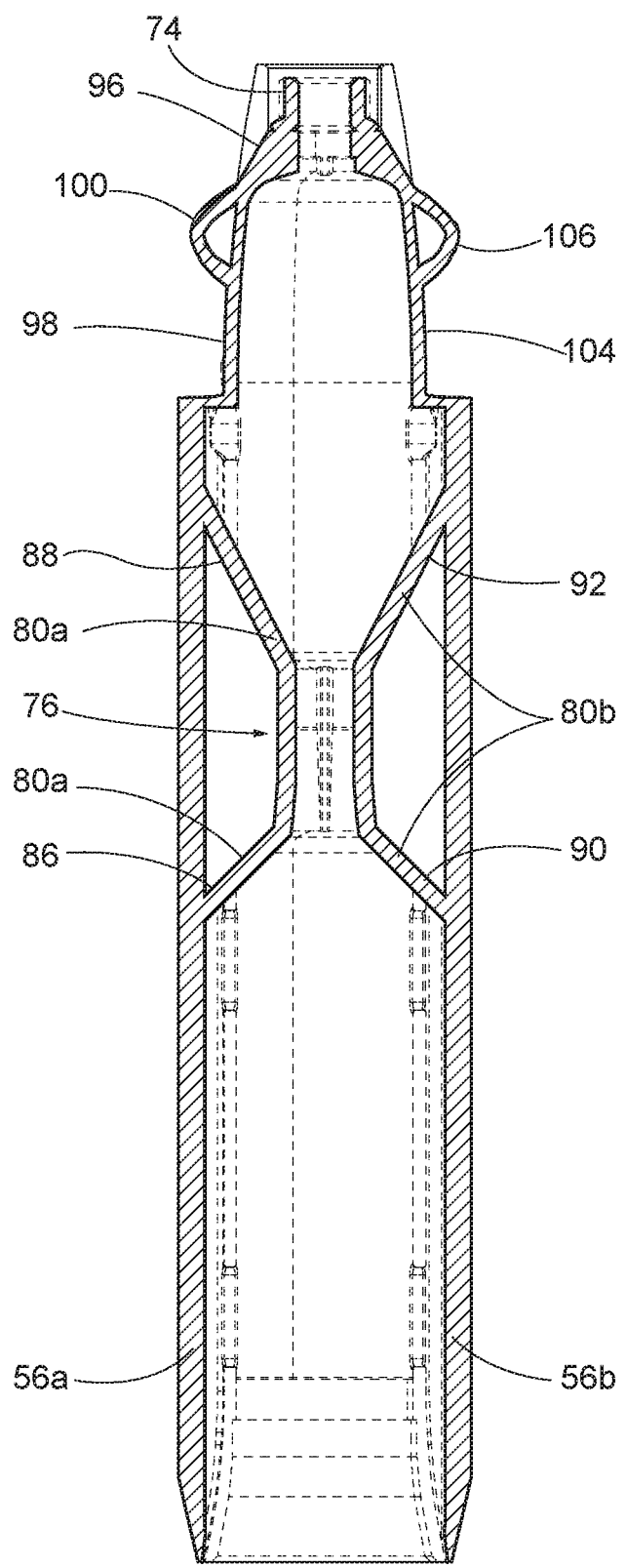
FIG. 8 is a cross-sectional view taken along line 8-8 of FIG. 5.

FIG. 8 is a cross-sectional view taken along line 8-8 of FIG. 5. FIG. 8 illustrates a portion of the first stalk roll portion including the support ring 76, a first radial portion 80a and a second radial portion 80b of the plurality of radial portions 80, and a first blade 56a and a second blade 56b of the plurality of blades 56. The first radial portion 80a includes a first end coupled to the support ring 76 and a second end that extends radially outward from the support ring 76 and is coupled to the first blade 56a. In some embodiments, the first blade 56a is integrally formed with the first radial portion 80a. The illustrated first radial portion 80a includes a first flange 86 extending from the support ring 76 to a first location on the first blade 56a and a second flange 88 extending from the support ring 76 to a second location on the first blade 56a.

The second radial portion 80b includes a first end coupled to the support ring 76 opposite the first radial portion 80a and a second end positioned radially outward from the support ring 76 and is coupled to the second blade 56b. In some embodiments, the second blade 56b is integrally formed with the second radial portion 80b. The illustrated second radial portion 80b includes a third flange 90 extending from the support ring 76 to a third location on the second blade 56b and a fourth flange 92 extending from the support ring 76 to a fourth location on the second blade 56b.

With continued reference to FIG. 8, a second support ring 96 is configured to engage the nut 74. While the illustrated nut 74 is shown as being integrally formed with the second support ring 96, the pieces could be formed separately and then coupled by inter-engaging threads or other suitable joining mechanism. A fifth flange 98 is coupled to the first blade 56a at a first end and is coupled to the second support ring 96 at a second end. A first auger blade 100 is coupled to the fifth flange and extends in a spiral between the first blade 56a and the second support ring 96. A sixth flange 104 is coupled to the second blade 56b at a first end and is coupled to the second support ring 96 at a second end. A second auger blade 106 extends in a spiral between the second blade 56b and the second support ring 96. In the illustrated embodiment, the fifth and sixth flanges 98 and 104 cooperate to form the frustoconical tip 50. In some embodiments, the fifth and sixth flanges 98 and 104 only extend around a portion of the perimeter such that the frustoconical tip 50 includes at least one opening between adjacent fifth and sixth flanges 98 and 104.

The first stalk roll portion includes the support ring 76, the plurality of radial portions 80a, 80b and the plurality of blades 56. In some embodiments, the first stalk roll portion also includes the second support ring 96, the flanges 98, 104 and the auger blades 100, 106. The first stalk roll portion includes a first material having a first tensile strength, a first material hardness and a first density. The second stalk roll portion 82 includes a second material having a second tensile strength, a second material hardness and a second density. The second material is different than the first material. The first material is stronger and harder than the second material. The relatively lighter and softer second material provides support to retain the adjacent blades 56 in the desired positions without adding significant weight to the first stalk roll 36. Lighter weight stalk rolls are desirable because it requires less energy to transport and rotate lighter weight stalk rolls, and is thereby more fuel efficient.

In some embodiments, the first tensile strength is at least fifty percent greater than the second tensile strength. In some embodiments, the first tensile strength is at least seventy five percent greater than the second tensile strength. In some embodiments, the first tensile strength is twice the second tensile strength.

In some embodiments, the first material hardness is at least fifty percent greater than the second material hardness. In some embodiments, the first material hardness is at least seventy five percent greater than the second material hardness. In some embodiments, the first material hardness is twice the second material hardness.

In some embodiments, the first density is at least fifty greater than the second density. In some embodiments, the first density is at least seventy five percent greater than the second density. In some embodiments, the first density is at least twice the second density.

In some embodiments, the first material is steel and the second material is aluminum. In other embodiments, the first material is steel and the second material is a polymer. In still other embodiments, the first material is aluminum and the second material is a polymer. The following table illustrates ranges of properties of steel, aluminum and polymers to illustrate the differences therebetween:

|  | Density - g/cm3 | Tensile Strength, MPa | Hardness |
| --- | --- | --- | --- |
| STEEL | 7.80-8.00 | 150-2100 | 100-900 Brinnell HB |
| ALUMINUM | 2.00-3.00 | 40-500 | 20-220 Brinnell HB |
| POLYMER | 0.6-2.40 | 5-120 | 70 Shore A- 150 Rockwell R |

The first material is metallic and the second material can be metallic or non-metallic. Other materials are possible and the above examples are given for information purposes only. In some embodiments, the space 84 between the support ring 76, the plurality of radial portions 80 and the second stalk roll portion 82 can be free of material to thereby form a hollow second stalk roll 38. In other embodiments, the space 84 is filled with one or more materials. Some such materials include a plastic or other composite. In some embodiments, the material in the space 84 is different from the first material and the second material. In other embodiments, the material in the space 84 is the same as the second material.

In operation, the first drive shaft 70 engages the central support ring 76 and the second support ring 96 such that the central support ring 76 and the second support ring 96 rotate in response to rotation of the first drive shaft 70. The first, second, third and fourth flanges 86, 88, 90, 92 are coupled to the central support ring 76 and rotate with the central support ring 76. The fifth and sixth flanges 98, 104 are coupled to the second support ring 96 and rotate with the second support ring 96. The blades 56 are coupled to respective flanges and rotate with the respective flanges in response to rotation of the first drive shaft 70. The first and second auger blades 100, 106 are coupled to the fifth and sixth flanges 98, 104 and rotate with the flanges 98, 104 in response to rotation of the first drive shaft 70. Therefore, the first drive shaft 70 is operable to rotate the plurality of blades 56 and the auger blades 100, 106 via the support rings 76, 96 and the flanges 86, 88, 90, 92, 98, 104. The second portion of the first stalk roll 36 can support the individual blades 56 and inhibit debris from entering the space 84 between the flanges. The second stalk roll 38 can operate in a similar manner to the operation of the first stalk roll 36.

Figure 9:
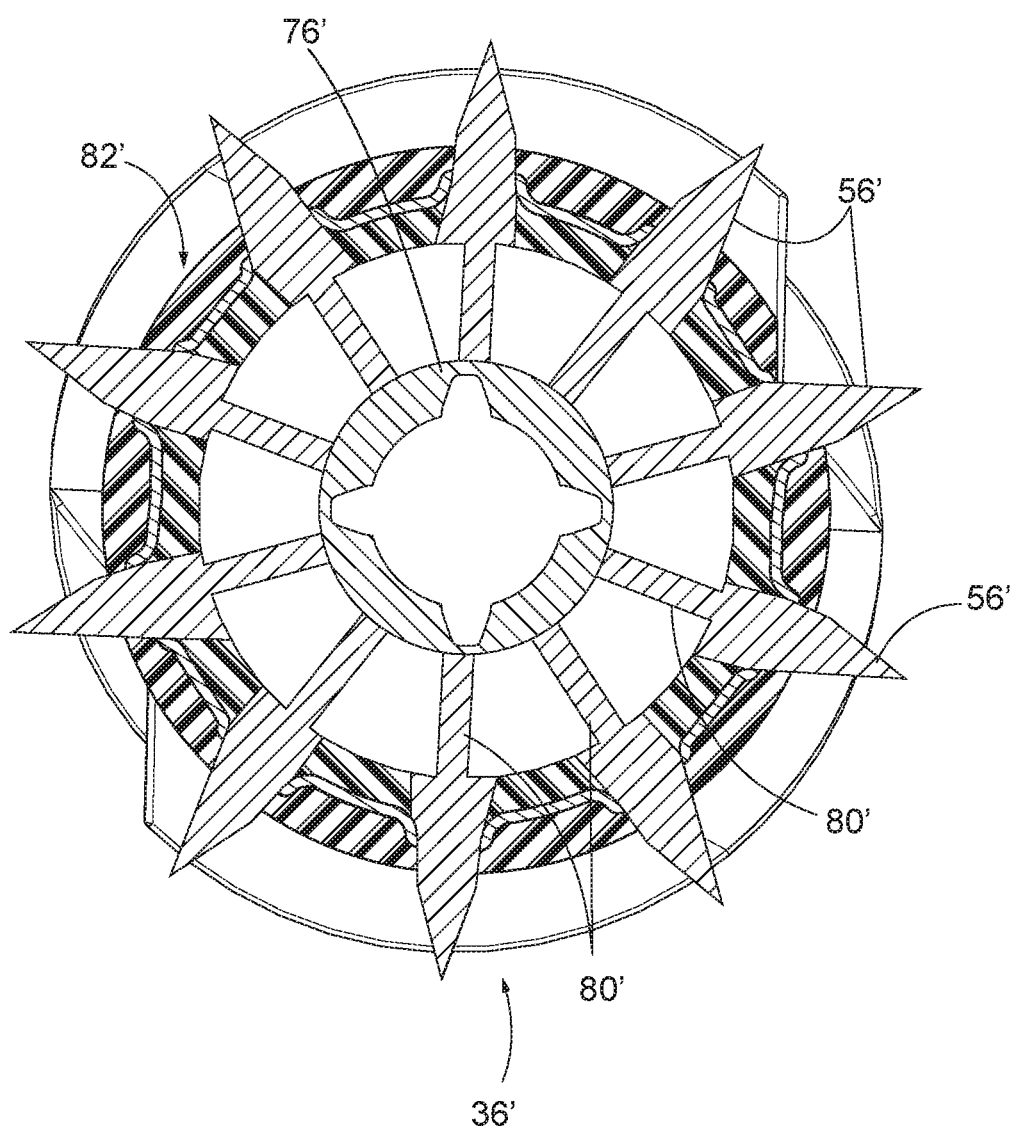
FIG. 9 is a cross-sectional view like the view of FIG. 7 according to some embodiments.

FIG. 9 is a cross-sectional view like the view of FIG. 7 according to some embodiments. Reference numbers include the prime (') notation to differentiate the embodiment of FIG. 9 from the embodiments shown in FIGS. 1-8. FIG. 9 illustrates a first stalk roll portion that includes the support ring 76', a plurality of radial portions 80' extending radially outward from the support ring 76', and the blades 56', and a second stalk roll portion 82' that is positioned between adjacent blades 56'. Like the stalk roll 36 described above, the first stalk roll portion includes a first material. The second stalk roll portion 82' includes a first layer, a second layer and a third layer. The first layer extends between adjacent blades 56' and substantially corresponds to the second stalk roll portion 82 in FIG. 7. The illustrated first layer includes a polymer or resin material. The second layer is positioned on a radially outward surface of the first layer and extends between adjacent blades 56'. The illustrated second layer includes a metallic material. The third layer is positioned on a radially outward surface of the second layer and extends between adjacent blades 56'. The illustrated third layer includes a polymer or resin material. In some embodiments the first layer and the third layer comprise the same material, whereas in other embodiments, the first layer and the third layer comprise different materials. The first, second and third layers cooperate to support the blades 56' around a perimeter of the stalk roll 36'.

The tensile strength of the second stalk roll portion 82' can be calculated as the combined tensile strength of the first, second and third layers or can be the smaller of the tensile strength for the first, second and third layers. The second layer can have a greater tensile strength than the first or third layers such that the second layer increases the strength of the second portion 82'.

In some embodiments, the first layer and the third layer comprise aluminum, and the second layer comprises steel. In other embodiments, the first layer and the third layer comprise a polymer, and the second layer comprises steel. In still other embodiments, the first layer and the third layer comprise a polymer, and the second layer comprises aluminum. Other configurations and materials can be utilized for the various layers of the second portion 82' and the above materials are given by way of example only.

What is claimed is:

1. A stalk roll for a corn harvester having a drive shaft configured to rotate the stalk roll, the stalk roll comprising:
   a first portion including a first material having a first density, the first portion including
      a support portion configured to engage the drive shaft,
      a first radial portion having a first end coupled to the support portion and a second end positioned radially outward from the support portion,
      a first blade directly coupled to the second end of the first radial portion, the first blade configured to engage a corn stalk,
      a second radial portion having a first end coupled to the support portion opposite the first radial portion and a second end positioned radially outward from the support portion, and a second blade directly coupled to the second end of the second radial portion, the second blade configured to engage a corn stalk; and a second portion including a second material having a second density, the second portion positioned between the first blade and the second blade, wherein the first density is at least fifty percent greater than the second density.

2. The stalk roll of claim 1, wherein the first radial portion includes a first flange extending from the support portion to a first location on the first blade and a second flange extending from the support portion to a second location on the first blade.

3. The stalk roll of claim 2, wherein the second radial portion includes a third flange extending from the support portion to a third location on the second blade and a fourth flange extending from the support portion to a fourth location on the second blade.

4. The stalk roll of claim 3, wherein the support portion is a first support portion and further comprising a second support portion spaced from the first support portion, the second support portion configured to engage a gear case mounting point.

5. The stalk roll of claim 4, wherein the first radial portion further includes a fifth flange extending between the first blade and the second support portion.

6. The stalk roll of claim 5, wherein the second radial portion further includes a sixth flange extending between the second blade and the second support portion.

7. The stalk roll of claim 6, further comprising a first auger blade coupled to the fifth flange of the first radial portion, and a second auger blade coupled to the sixth flange of the second radial portion.

8. The stalk roll of claim 1, wherein the first material has a first hardness and the second material has a second hardness, the first material hardness being at least fifty percent greater than the second material hardness.

9. The stalk roll of claim 1, wherein the first material is metallic and the second material is non-metallic, and wherein the first blade is integrally formed with the first radial portion and wherein the second blade is integrally formed with the second radial portion.

10. A corn harvester comprising:
a work vehicle configured to move along a ground surface;
a crop divider configured to separate adjacent rows of corn stalks;
a drive shaft configured to rotate in response to operation of the work vehicle;
a first stalk roll portion including a first material having a first tensile strength, the first stalk roll portion including
a first support portion configured to engage the drive shaft,
a first radial portion having a first end coupled to the support portion and a second end positioned radially outward from the support portion,
a first blade coupled to the second end of the first radial portion, the first blade configured to engage a corn stalk,
a second radial portion having a first end coupled to the support portion spaced from the first radial portion to define a space between the first radial portion and the second radial portion, and a second end positioned radially outward from the support portion, and
a second blade coupled to the second end of the second radial portion, the second blade configured to engage a corn stalk; and a second stalk roll portion including a second material having a second tensile strength, the second stalk roll portion positioned between the first blade and the second blade, wherein the first tensile strength is at least fifty percent greater than the second tensile strength.

11. The corn harvester of claim 10, wherein the first radial portion includes a first flange extending from the support portion to a first location on the first blade and a second flange extending from the support portion to a second location on the first blade.

12. The corn harvester of claim 11, wherein the second radial portion includes a third flange extending from the support portion to a third location on the second blade and a fourth flange extending from the support portion to a fourth location on the second blade.

13. The corn harvester of claim 12, wherein the support portion is a first support portion and further comprising a second support portion spaced from the first support portion, the second support portion configured to engage a gear case mounting point.

14. The corn harvester of claim 13, wherein the first radial portion further includes a fifth flange extending between the first blade and the second support portion.

15. The corn harvester of claim 14, wherein the second radial portion further includes a sixth flange extending between the second blade and the second support portion.

16. The corn harvester of claim 15, further comprising an auger blade coupled to the fifth flange of the first radial portion and coupled to the sixth flange of the second radial portion.

17. The corn harvester of claim 16, wherein the auger blade is a first auger blade, and further comprising a second auger blade coupled to the fifth flange of the first radial portion and coupled to the sixth flange of the second radial portion.

18. The corn harvester of claim 10, wherein the first material is metallic and the second material is non-metallic, and wherein the first material has a first density and the second material has a second density, the first density being at least fifty percent greater than the second density.

19. The corn harvester of claim 10, wherein the first blade is integrally formed with the first radial portion and wherein the second blade is integrally formed with the second radial portion.

20. A stalk roll for a corn harvester having a drive shaft configured to rotate the stalk roll, the stalk roll comprising:
a first portion including a first material having a first tensile strength, the first portion including
a first central support portion configured to engage the drive shaft,
a first flange extending from the first central support portion to a first location radially spaced from the first central support portion,
a second flange extending from the first central support portion to a second location radially spaced from the first central support portion,
a first blade coupled to the first flange at the first location and coupled to the second flange at the second location, the first blade configured to engage a corn stalk, the first blade being integrally formed with the first flange, and the first blade being integrally formed with the second flange,
a third flange extending from the first central support portion to a third location radially spaced from the first central support portion and opposite the first flange, a fourth flange extending from the first central support portion to a fourth location radially spaced from the first central support portion and opposite the second flange, a second blade coupled to the third flange at the third location and to the fourth flange at the fourth location, the second blade configured to engage a corn stalk, and the second blade being integrally formed with the third flange, and the second blade being integrally formed with the fourth flange, a second central support portion spaced from the first central support portion, the second central support portion configured to engage a gear case mounting point, a fifth flange extending between the first blade and the second central support portion, a first auger blade coupled to the fifth flange and extending toward the second central support portion, a sixth flange extending between the second blade and the second central support portion, and a second auger blade coupled to the sixth flange and extending toward the second central support portion; and a second portion including a second material having a second tensile strength, the second portion positioned between the first flange and the third flange, wherein the first tensile strength is at least fifty percent greater than the second tensile strength, wherein the first material is metallic and the second material is non-metallic, and wherein the first material has a first density and the second material has a second density, the first density being at least fifty percent greater than the second density.

\* \* \* \* \*